(12) United States Patent
Stieglbauer

(10) Patent No.: US 7,900,443 B2
(45) Date of Patent: Mar. 8, 2011

(54) PARTICLE FILTER ARRANGEMENT

(75) Inventor: Herbert Stieglbauer, Penzberg (DE)

(73) Assignee: Ark-Holding AG (CH)

( * ) Notice: Subject to any disclaimer, the term of this patent is extended or adjusted under 35 U.S.C. 154(b) by 0 days.

(21) Appl. No.: 12/143,405

(22) Filed: Jun. 20, 2008

(65) Prior Publication Data

US 2008/0245060 A1 Oct. 9, 2008

Related U.S. Application Data

(63) Continuation of application No. PCT/EP2006/012466, filed on Dec. 22, 2006.

(30) Foreign Application Priority Data

Dec. 22, 2005 (DE) .......................... 10 2005 062 050
Apr. 13, 2006 (EP) .................................... 06007797

(51) Int. Cl.
*F01N 3/00* (2006.01)
(52) U.S. Cl. ................. 60/297; 60/274; 60/288; 60/296; 60/311
(58) Field of Classification Search .................... 60/274, 60/287, 288, 296, 297, 311, 324; 422/171, 422/176, 177
See application file for complete search history.

(56) References Cited

U.S. PATENT DOCUMENTS

| | | | | |
|---|---|---|---|---|
| 2,898,202 | A * | 8/1959 | Eriksson et al. | 422/115 |
| 4,404,798 | A * | 9/1983 | Takagi et al. | 60/296 |
| 4,916,897 | A * | 4/1990 | Hayashi et al. | 60/286 |
| 5,685,143 | A | 11/1997 | Aitta et al. | |
| 6,312,650 | B1 * | 11/2001 | Frederiksen et al. | 422/180 |
| 6,655,133 | B2 * | 12/2003 | Kimura et al. | 60/296 |
| 6,715,583 | B2 * | 4/2004 | Santos | 181/251 |
| 6,874,316 | B2 * | 4/2005 | Nakatani | 60/286 |
| 6,935,105 | B1 | 8/2005 | Page et al. | |
| 7,210,287 | B2 * | 5/2007 | Bolander et al. | 60/296 |

FOREIGN PATENT DOCUMENTS

| | | |
|---|---|---|
| DE | 19515649 | 10/1995 |
| GB | 2128894 A | 5/1984 |
| WO | 9012950 | 11/1990 |

* cited by examiner

*Primary Examiner* — Tu M Nguyen
(74) *Attorney, Agent, or Firm* — Edell, Shapiro & Finnan, LLC

(57) ABSTRACT

A particle filter arrangement for filtering exhaust gases of an internal combustion engine such as a diesel internal combustion engine, includes an inlet and an outlet and at least one particle filter arranged in the flow path of the exhaust gases between the inlet and outlet. The exhaust gases are conducted in a line, with the line having a first segment in which the exhaust gases are conducted substantially in the direction of the outlet. The line has a second segment in which the exhaust gases are conducted substantially in the direction of the inlet. An operating temperature of the arrangement sufficiently high to prevent full loading of the filter is generated particularly quickly in that the line also includes a third segment in which the exhaust gases are conducted substantially in the direction of the outlet.

19 Claims, 5 Drawing Sheets

PARTICLE FILTER ARRANGEMENT

CROSS REFERENCE TO RELATED APPLICATIONS

This application is a continuation of International Application No. PCT/EP2006/012466, filed on Dec. 22, 2006, entitled "Particulate Filter Assembly," which claims priority under 35 U.S.C. §119 to Application No. DE 102005062050.7 filed on Dec. 22, 2005, entitled "Canning of a Soot Particle Filter with Exhaust-Gas Recirculation within the Filter System, in Particular, Incl. a Double Oxy-Regeneration Catalytic Converter and Double Filtering of the Smoke Gases," and to Application No. EP 06007797.1 filed on Apr. 13, 2006, entitled "Particulate Filter Arrangement," the entire contents of each of which are hereby incorporated by reference.

BACKGROUND

The present invention relates basically to the field of after treatment of exhaust gases. More precisely, the present invention relates, according to a first aspect, to a particle filter arrangement for filtering exhaust gases of an internal combustion engine, in particular of a diesel internal combustion engine, having an inlet and an outlet, with at least one particle filter being arranged in the flow path of the exhaust gases between the inlet and outlet, with the exhaust gases being conducted in a line, with the line having a first section or segment in which the exhaust gases are conducted substantially in the direction of the outlet, with the line also having a second section or segment in which the exhaust gases are conducted substantially in the direction of the inlet. According to a second aspect, the present invention relates to a particle filter arrangement for filtering exhaust gases of an internal combustion engine, in particular of a diesel internal combustion engine, having an inlet and an outlet, with a deflecting element for changing the direction of the exhaust-gas flow being provided in the flow path of the exhaust gases between the inlet and the outlet. According to a third aspect, the present invention relates to a particle filter arrangement for filtering exhaust gases of an internal combustion engine, in particular of a diesel internal combustion engine, having an inlet and an outlet. According to a fourth aspect, the present invention relates to a method for filtering exhaust gases of an internal combustion engine, in particular of a diesel internal combustion engine, by means of a particle filter arrangement having an inlet and an outlet.

Exhaust gases which are generated by internal combustion engine or industrial processes generally contain potentially harmful constituents such as for example hydrocarbons (HC), carbon monoxide (CO), nitrogen oxide ($NO_x$) and in particular also particle constituents such as for example particulate matter. Such constituents must be converted into harmless or at least less harmful constituents in order to reduce the quantity of harmful substances which are discharged to the atmosphere. The exhaust gases are therefore conventionally subjected to a catalytic treatment and/or a filtering process.

Also fundamentally known in the prior art are catalytic converters which serve to remove harmful constituents such as for example $SO_x$ and $NO_x$ from the exhaust gases. In addition, a catalytic converter also has the effect of increasing the temperature of exhaust gases, which can in turn assist the breakdown of soot particles.

In diesel engines, there is the basic problem that soot particles (CO) in particular are contained in the exhaust gases. To remove these exhaust gases, particle filters are known. The soot particles are generated in particular by the addition of additives to the fuel. Although the particle filter can remove the soot from the exhaust gases, it does however have the problem that it becomes blocked or fully laden if too many soot particles are stored in it. At a correspondingly high temperature (above approximately 400° C.), however, the CO is broken down, and a fully-laden filter can therefore be regenerated at such a temperature. It is therefore particularly important for the temperature of the exhaust gases to be as high as possible before and during the filtering, and in particular also for the temperature in the filter to be as high as possible, such that the "ignition temperature" is reached.

Here, it is particularly important that the installation space of the overall particle filter arrangement and of the particle filter itself is as small as possible, and that a high temperature is reached as quickly as possible such that the auto-ignition effect starts, since otherwise the filter becomes blocked too quickly and for example a motor vehicle is no longer operational. In particular in the case of a driving pattern in which the vehicle is driven for only a few minutes per day ("fetching rolls in the morning"), the filter can become ever more fully-laden with soot particles without a sufficiently high temperature for burning off the soot being reached, so that after some time, the motor is no longer operational and the filter must be exchanged. How fast a required high temperature is reached is therefore also particularly important. These are known problems in the prior art, which are associated with the cold start of an engine (with a correspondingly cold catalytic converter) and with "cold exhaust gases" as are discharged by a diesel engine.

The temperatures of the exhaust gases are fundamentally dependent on the type of diesel engine used and, in the case of motor vehicles, are of course dependent on the respective type. Normally, in a motor vehicle, the temperatures of the exhaust gases are supposed to be between 150 and 210° C. In the case of a naturally-aspirated engine, the temperatures of the exhaust gases are approximately 280° C. and, with a turbocharger, 350° C. The problem of the full loading of a required particle filter is therefore significantly less serious in a naturally-aspirated engine or turbocharged engine, since the outlet temperatures of the exhaust gases are already correspondingly high. For normal diesel engines, the full loading or blockage of the particle filter is in practice a serious problem which the prior art cannot sufficiently remedy.

SUMMARY

The invention is therefore based on the object of avoiding the disadvantages of the prior art and in particular refining a particle filter arrangement of the type specified in the introduction in such a way that a sufficiently high operating temperature of the arrangement and of the particle filter is generated particularly quickly in order to prevent full loading of the filter.

According to a first aspect of the present invention, the object is achieved with a particle filter arrangement of the type specified in the introduction in that the line also has a third section or segment in which the exhaust gases are conducted substantially in the direction of the outlet.

One particular advantage of the design according to the invention is that the "folded" flow path, so to speak, of the exhaust gases generated by the three segments results in a very compact particle filter arrangement, which has a long path for the exhaust gases, such that the residence time of the exhaust gases in the arrangement is relatively long. In particular if the components, such as for example catalytic converters, which serve to increase temperature of the exhaust gases are arranged in the flow medium path, with the long flow path also permitting corresponding points for the arrangement of such components, the exhaust gases reach high temperatures, which, together with the long residence time, has a correspondingly favorable effect on the equilibrium temperature which results in the overall arrangement or also on the speed with which such an equilibrium temperature is reached.

The exhaust gases preferably flow through the first, second and third segments of the line in series. Here, the first, second and third segments of the line need not necessarily follow one another directly; it is also possible for corresponding interposed segments to be provided. In this exemplary embodiment, only the first segment, then the second segment and finally the third segment of the line are traversed in the sequence. This means that the exhaust gases are conducted firstly substantially in the direction of the outlet, are then later conducted substantially in the direction of the inlet, and therefore back in the opposite direction, and are finally conducted substantially in the direction of the outlet again. Here, there is preferably a folding of the exhaust-gas path substantially in the manner of a degenerated "Z". This can be clearly seen in the upper and lower halves of the longitudinal section illustrations in FIG. 3.

The at least one particle filter is advantageously arranged in the first, second or third segment of the line. Here, it is preferable for the at least one particle filter to be arranged in a line segment in which the exhaust gases have already been brought up to a temperature which is sufficiently high that full loading of the filter is no longer possible or the entire filtering process is significantly more effective on account of the increased temperature.

In order to further improve the result of the exhaust-gas after treatment, it is preferable for a further particle filter to be arranged in the first, second or third segment. The provision of a further particle filter increases the efficiency of the filtering, and the further particle filter is preferably also arranged in a different segment of the line from the at least one particle filter.

From a structural aspect, but also to reduce production costs, it is preferable for the at least one particle filter and the further particle filter to be formed in one piece as a filter monolith. If the filter monolith has corresponding ducts, which are not connected to one another, for conducting the exhaust gases, it is possible by means of corresponding seal (s) provided at the inlet-side and/or outlet-side end of the filter monolith to ensure that the different line segments are separated from one another in the filter monolith too.

It is also preferable for regions of the line in which the flow direction of the exhaust gases is substantially reversed to be provided between the first and the second segments and the second and the third segments. A catalytic converter is advantageously arranged in at least one of the regions. In addition to the actual effect of a catalytic converter, specifically that of catalytic pre-treatment, the catalytic converter also serves to increase the temperature of the exhaust-gas flow and of the overall arrangement, which assists the filtering process and prevents full loading of the filter. By means of the corresponding design of the exhaust-gas flow path, possibilities are created for installing one or more catalytic converters in the flow path. This can take place in such a way that the exhaust gases still remain in the arrangement after passing through the catalytic converter, and therefore the increased temperature has a favorable positive effect on the overall temperature of the arrangement.

From a structural aspect, it is preferable for the first, second and third segments of the line to be arranged concentrically with respect to one another. Here, one practically meaningful realization provides that one of the first, second and third segments has the shape of a cylinder, and the two other segments have the shape of an annular cylinder or pipe. One of the first, second and third segments is advantageously formed by the interior space of a first pipe and therefore has a substantially cylindrical shape (circular in cross section). For the two further segments, two further pipes are provided which are substantially concentric with respect to the first pipe and have two different diameters which are both larger than the first pipe; one of the two further segments is then formed in the space between the outer wall of the first pipe and the inner wall of the second pipe (with a smaller diameter than the third pipe) and the second of the two further segments is formed in the space between the outer wall of the second pipe and the inner wall of the third pipe (with a larger diameter than the second pipe). The two further segments therefore have an annular shape in cross section. This results in a particularly compact design of the first, second and third line segments, since no installation space is lost for this purpose, and the arrangement composed of the three line segments has the shape of a cylinder overall.

In one preferred exemplary embodiment of the present invention, the following is provided: canning a soot particle filter with exhaust-gas recirculation within the filter system or arrangement, in particular including or with preferably a double oxy-regeneration catalytic converter and preferably double filtering of the smoke gases.

A particularly good exchange of heat between the exhaust-gas flows of the arrangement is provided in that the first and second segments and/or the second and third segments and/or the first and third segments of the line are separated by a common wall.

The particle filter arrangement advantageously has a distributing and deflecting element which conducts a first exhaust-gas flow passing from the inlet to the first segment of the line and which deflects a second exhaust-gas flow passing from the second segment of the line to the third segment of the line. The distributing and deflecting element therefore has dual functionality. This is preferably realized by means of a star-shaped deflection in which the different exhaust-gas flows intersect one another multiple times without being mixed. The crossing or intersecting exhaust-gas guidance has the effect that the distributing and deflecting element is heated, specifically also dependently from the catalytic converters which are used, and therefore also serves as a heat-exchanging element. Here, a pre-combustion of soot particles positively takes place before the soot particles enter into the particle filter itself. This reduces the spatial requirement of the arrangement enormously. As a result of the deflecting functionality, it is possible even for a purified exhaust gas to be conducted once more through a particle filter in order to realize further catalytic treatment and filter functions.

It is also preferable for the distributing and deflecting element to have respective ducts for conducting the first and second exhaust-gas flows, with at least a part of the outer wall of the duct of the first exhaust-gas flow forming the inner wall of the duct of the second exhaust-gas flow.

The particle filter arrangement advantageously has at least the following sections in the direction from the inlet to the outlet: a first section which has a distributing and deflecting element for the exhaust gases; a second section which has at least one particle filter; and a third section which has a deflecting element for the exhaust gases. In this regard, the overall particle filter arrangement is asymmetrical in the sense that the first section has an element which serves both to distribute and also deflect, while the third section has only a deflecting element.

The first, second and third segments of the line are advantageously arranged in the second section of the particle filter arrangement.

It is also preferable for the particle filter arrangement to have a catalytic converter arranged directly downstream of the inlet and/or upstream of the first segment of the line in the flow direction of the exhaust gases.

In order to further increase the filtering efficiency, it is preferable for the particle filter arrangement to have a particulate matter filter arranged directly upstream of the outlet and/or downstream of the third segment of the line in the flow direction of the exhaust gases.

According to a second aspect of the present invention, the object is achieved with a particle filter arrangement of the type specified in the introduction in that the deflecting element has a catalytic converter.

One particularly preferable practical realization is provided in that the deflecting element is embodied as a substantially U-shaped duct for the exhaust-gas flow, in which U-shaped duct the catalytic converter is at least partially arranged. This can be clearly seen from the upper and lower halves of the longitudinal section illustrations in FIGS. 1a and 2a. By means of the substantially U-shaped duct, a deflection by approximately 180 degrees, that is to say a fold of the exhaust-gas flow path, is realized, which serves to lengthen the flow path, but with the overall construction being kept compact at the same time.

Here, it is also preferable for the catalytic converter to be formed from a wire mesh.

According to a third aspect of the present invention, the object is achieved with a particle filter arrangement of the type specified in the introduction in that the particle filter arrangement has a distributing and deflecting element which distributes a first exhaust-gas flow so as to substantially maintain its direction in the arrangement, and which deflects a second exhaust gas flow, which flows in substantially the opposite direction, by an angle, preferably approximately 180 degrees, with the two exhaust-gas flows not being mixed.

According to a fourth aspect of the present invention, the object is achieved with a method of the type specified in the introduction in that the flow direction of the exhaust gases is deflected by approximately 180 degrees at least twice between the inlet and outlet.

Further preferred embodiments of the invention are disclosed in the dependent patent claims.

BRIEF DESCRIPTION OF THE DRAWINGS

The invention, and further features, aims, advantages and possible applications thereof, is or are explained in more detail below on the basis of a description of preferred exemplary embodiments, with reference to the appended drawings. In the drawings, the same reference symbols refer to the same or corresponding elements. In the present description, the expression "flow direction" of the exhaust gases is used. This of course means the mean flow direction of the exhaust gases, with it being clear to a person skilled in the art that individual particles of the exhaust gases can deviate in terms of their movement direction from the mean or primary flow direction (indicated in the drawing by arrows). The expressions "upstream" and "downstream" and the like are used to specify relative arrangements in relation to the main flow direction, which is generally from the inlet to the outlet. Here, all the features which are described and/or depicted in the figures are the subject matter of the present invention individually or in any meaningful combination, specifically independently of their summary in the patent claims or their references back. In the drawings:

DETAILED DESCRIPTION

Figure 1A:
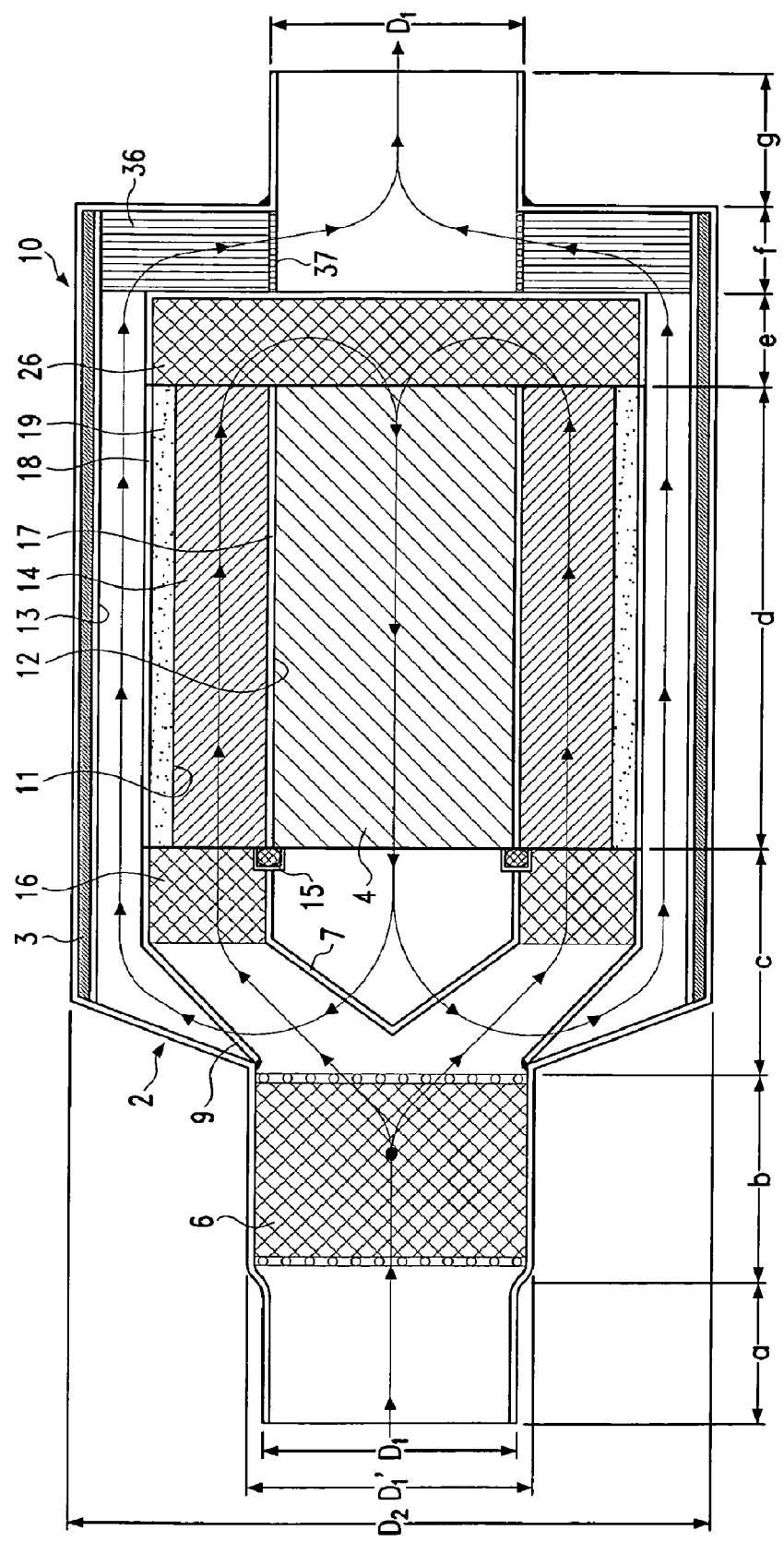
FIG. 1a shows a schematic illustration in longitudinal section for explaining a first exemplary embodiment of a particle filter arrangement according to the invention.

With reference to the section views of FIGS. 1a to 1c, a first exemplary embodiment of a particle filter arrangement 10 is explained in more detail below with regard to its construction and function. FIG. 1a shows, in a highly schematic illustration, a longitudinal section view of the particle filter arrangement 10 according to the invention. The particle filter arrangement 10 according to the invention has, in the main flow direction of the exhaust gases (in the direction from the inlet to the outlet, that is to say from left to right in FIGS. 1a and 2a), an inlet section a, a filter pre-section b, a front deflecting section or first section c (indicated only highly schematically in FIG. 1a), a filter section or second section d, a rear deflecting section or third section e, a filter post-section f and an outlet section g, all of which are formed in a common housing 2. The particle filter arrangement 10 is connected via the inlet section a for example to an engine (not illustrated) of a motor vehicle, from which in particular soot-particle-containing exhaust gases are supplied via lines (not illustrated) to the inlet section a of the particle filter arrangement 10. The particle filter arrangement 10 is connected via the outlet section a to an exhaust (not illustrated). It is of course also possible for various further components, such as for example a catalytic converter, to be provided between the engine and the inlet section a. It is likewise possible for various further components, such as for example a carburetor, to be arranged between the outlet section g of the particle filter arrangement 10 and the tail pipe. The particle filter arrangement 10 according to the invention is therefore inserted and fastened into the exhaust system at a suitable point for example by means of a welded or flange connection and serves for purifying the exhaust gases in order to adhere to or even undershoot required limit values for the degree of purity of the exhaust gases. The particle filter arrangement 10 is formed generally symmetrically with respect to a central longitudinal axis (not shown). The inlet section a has a tubular cross section with an outer diameter $D_1$. The filter pre-section b, which is arranged directly downstream of the inlet section a in the flow direction of the exhaust gases, likewise preferably has a tubular cross section with an outer diameter which is slightly widened in outer diameter, $D_1'>D_1$. The front deflecting section c, which directly adjoins the filter pre-section b in the flow direction of the exhaust gases, widens initially from the outer diameter $D_1'$ to an outer diameter $D_2$ which is constant along the rest of the length of the section c. Across the region of the particle filter arrangement 10 with constant outer diameter $D_2$, the housing 2 has thermal insulation 3 within the housing. The filter section d, the rear deflecting section e and the filter post-section f have the constant outer diameter $D_2$. A step is formed between the filter post-section f and the outlet section g, such that the outlet section g has the outer diameter $D_1$ again. The inner construction of the front deflecting section c is merely indicated in FIG. 1a for clarity, and is illustrated in more detail in FIGS. 1b and 1c. The front deflecting section c has the function of conducting or distributing the exhaust gases passing from the inlet section a and the filter pre-section b to corresponding regions, more precisely to a region which is offset radially in the direction of the center, of the filter section d. Furthermore, the front deflecting section c has the function of reversing the direction of the exhaust gases, which flow in the opposite direction, that is to say backward, so to speak (without the exhaust gases being mixed with the newly-delivered exhaust gases), from certain regions, more precisely from a central region, of the filter section d, by approximately 180 degrees, that is to say the function of deflecting the exhaust gases in such a way that they flow in the main flow direction from the inlet section a to the outlet section g again and are re-introduced into the filter section d of the particle filter arrangement 10 according to the invention, albeit in a region radially at the very outside. On account of the functionalities of the first section c of the particle filter arrangement 10 according to the invention, the first section c can also be referred to as the front distributing and deflecting section c. The primary function of the filter section or second section d of the particle filter arrangement 10 according to the invention is that of filtering the exhaust gases. The third or rear deflecting section e serves for distributing the exhaust-gas flows delivered from a radially offset annular region into an inner cylindrical region of the filter section d, with the flow direction being reversed by approximately 180 degrees. Catalytic treatment of the exhaust gases also takes place here. The filter post-section f provides a deflection of the exhaust gases by 90 degrees twice from the radially outer region back into the central region of the filter outlet section g, specifically while effectively maintaining the main flow direction from the inlet to the outlet, with a catalytic treatment likewise being provided here in a guide section, which runs approximately perpendicularly with respect to the central axis, for the exhaust gases.

Below, the construction of the particle filter arrangement 10 according to the invention will now be explained in further detail. Arranged in the filter pre-section b with the outer diameter $D_1'$ is a catalytic converter 6 which can also be referred to as a first pre-catalytic converter, since it is positioned upstream of the filtering. The filter section d is formed substantially symmetrically with respect to the central longitudinal axis of the particle filter arrangement 10 and has a central cylindrical particle filter 4 which extends in the radial direction from the central axis to approximately one-third of half of the outer diameter $D_2$, and in the longitudinal direction over approximately half of the length of that part of the particle filter arrangement 10 which is formed by the sections c, d, e and f. Arranged around the cylindrical particle filter 4 is an annular particle filter 14, with both particle filters 4, 14 being separated by a common annular wall 17. The two particle filters 4 and 14 are preferably silicon carbide (SiC) particle filters. The annular particle filter has a thickness which corresponds to approximately one-third of half of the outer diameter $D_2$ of the second filter section 2. Here, the preferred practical realization of the cylindrical particle filter 4 and of the annular particle filter 14 takes place preferably by means of a monolith which, for filtering, has a multiplicity of ducts which extend in the longitudinal direction and which are not connected to one another, with a functional separation of the monolith into the two filter sections 4, 14 being provided by means of a seal 15 which is provided, at the end facing toward the inlet section a, at the circular boundary between the filters 4, 14. The common wall 17 is formed here by the multiplicity of outer walls of the outermost ducts of the filter 4. Formed radially outside the particle filter 14 is an annular duct which is delimited at the inside by an outer wall 18 of the filter 14, with a seal and/or thermal insulation 19 formed within the outer wall 18, and at the outside by an inner wall of the housing 2 in the region of the sections c, d, e and f. No element which serves to provide exhaust-gas treatment is arranged in the duct, since the duct serves primarily for transporting the exhaust-gas flow in the direction from the inlet to the outlet. Arranged between the filter pre-section b and the filter section d is the deflecting section c which, in the exemplary embodiment, has four ducts in order to deflect exhaust gases passing from the filter pre-section b through an annular second pre-catalytic converter 16 into the outer particle filter 14. In FIG. 1a, two ducts are visible, which ducts are formed by the inner wall 7 and the outer wall 9. Here, the second pre-catalytic converter 16 has substantially the same inner diameter as the particle filter 14. Here, the outer diameter of the pre-catalytic converter 16 likewise substantially corresponds to that of the particle filter 14, and more precisely to that of the wall 18 which is arranged around the particle filter 14. Furthermore, the particle filter arrangement has a third cylindrical (pre-)catalytic converter 26 at an end, which faces toward the outlet, of the filter section d, and more precisely in the rear deflecting section e, the outer diameter of which (pre-)catalytic converter 26 corresponds approximately to that of the particle filter 14 or of the wall 18 (and therefore also to that of the second pre-catalytic converter 16). In addition to the actual catalytic converter function, the annular catalytic converter is used for deflecting the exhaust-gas flow by approximately 180 degrees from the outer particle filter 14 into the central particle filter 4. According to the invention, the exhaust gases in the filter section d are conducted in different directions within the particle filter arrangement 10. More precisely, a line is formed in the particle filter arrangement 10, which line has three sections or "segments" in the filter section d of the particle filter arrangement 10. In the particle filter 14, the line has a first (line) segment 11 in which the exhaust gases flow in the direction from the inlet toward the outlet (from left to right in the drawing). Furthermore, in the central particle filter 4, the exhaust line has a second (line) segment 12 in which the exhaust gases flow substantially in the direction from the outlet toward the inlet. At the very outside, the line has a third (line) segment 13, with the third line segment 13 corresponding to the annular duct provided radially at the outside, and in which third line segment 13 the flow direction of the exhaust gases is once again from the inlet toward the outlet. The first, second and third line segments are traversed by the exhaust-gas flow in the sequence. According to the terminology of the present application, the front and rear ends of the line segments 11, 12 and 13 coincide with those of the filter section d. Provided downstream of the rear deflecting section e is the filter post-section f which has an annular post-catalytic converter 36 whose inner diameter corresponds to that of the particle filter 14 and whose outer diameter corresponds to that of the third line segment or duct 13. Since the catalytic converter 36 is positioned downstream of the actual filtering, the catalytic converter 36 is referred to as a post-catalytic converter. By means of the post-catalytic converter 36, and an annular perforated plate 37 which is attached along its inner periphery, the exhaust gases are conducted into the outlet section g, in which the exhaust gases emerge centrally out of the particle filter arrangement 10 along the central axis. More precisely, the exhaust gases are deflected by approximately 90 degrees as they enter into the post-catalytic converter 36 and are deflected by approximately 90 degrees again as they emerge out of the post-catalytic converter 36. A particulate matter filter (not illustrated) can optionally be positioned downstream of the post-catalytic converter 36, which particulate matter filter is arranged in the filter post-section f but can also project into the tubular outlet section g.

The exhaust gases which flow through the inlet section a and the filter pre-section b and which are pre-treated by the catalytic converter 6 are distributed, by means of the deflecting section c of the particle filter arrangement 10 according to the invention, through the second pre-catalytic converter 16 into the first line segment 11, in which the exhaust gases are filtered by means of the particle filter 14. After flowing through the first line segment 11, the exhaust gases are not only catalyzed by means of the catalytic converter 26, which extends over the outlet-side ends of the first and second line segments 11, 12, but are also deflected by approximately 180 degrees, such that, after passing through the first line segment 11 and the catalytic converter 26, the exhaust gases in the line segment 12 of the particle filter arrangement 10 will flow back again in the direction of the inlet section a on account of the deflection of the catalytic converter 26, and will be filtered therein by means of the main particle filter 4. The exhaust gases which flow backward in the second line segment 12 therefore pass once again into the deflecting section c of the particle filter arrangement 10, in which the exhaust gases are deflected by 180 degrees again, specifically in such a way that no mixing takes place with the exhaust-gas flows passing from the inlet section a. Here, the exhaust-gas flows passing from the second line segment 12 are conducted into the third line segment 13 arranged radially at the outside. In the third line segment 13, the exhaust gases flow once again in the direction from the inlet toward the outlet. After passing through the third line segment 13, the exhaust-gases are after treated by means of the post-catalytic converter 36 before emerging via the outlet section g in the direction of the tailpipe.

The exhaust gases therefore enter into the particle filter arrangement 10 through the inlet section a and are pre-treated by means of the pre-catalytic converters 6, 16. As per an effect which is known in the prior art, the pre-catalytic converters 6, 16 already provide a temperature increase of the exhaust gases, such that the latter have an increased temperature as they enter into the first line segment 11 of the particle filter arrangement 10. In the section, the particle filter 14 serves to filter the exhaust gases primarily with regard to soot. As explained in the introduction, the filtering is significantly more effective as a result of the increased temperature of the exhaust gases. After passing through the first line segment 11, the exhaust gases are deflected in terms of their flow direction by 180 degrees, into the centrally-arranged second line segment 12, by the catalytic converter 26. Here, the catalytic converter 26 which is arranged at the rear end side of the two line segments 11 and 12 not only provides a reversal of the flow direction and conducts the flow from the first line segment 11 into the second line segment 12, but rather a further temperature increase of the exhaust gases takes place corresponding to the catalytic converters 6, 16. In the second line segment 12, the exhaust gases flow from the filter section d of the particle filter arrangement 10 back into the deflecting section c. In the particle filter arrangement 10, the fully-filtered exhaust gases which are delivered from the second line segment 12 are now, without being mixed with the exhaust gases passing from the inlet section a, conducted, with another reversal of the flow direction, into the outermost region of the filter section d of the particle filter arrangement 10, and more precisely into the third line segment 13 in which no exhaust-gas treatment means are provided. After flowing through the post-catalytic converter 36, the exhaust gases emerge out of the outlet section g in the direction of the tailpipe. In the first exemplary embodiment of a particle filter arrangement 10 according to the invention illustrated in FIGS. 1a to 1c, a two-fold deflection of the exhaust gases by approximately 180 degrees therefore takes place. The two-fold deflection ensures firstly that the exhaust gases are once again flowing in the original flow direction, from the inlet section a toward the outlet section g, as they emerge out of the particle filter arrangement 10 according to the invention. Heating of the exhaust gases takes place in particular at the catalytic converters 6, 16 and 26. On account of the counter-flow effect (the first, second and third line segments 11, 12 and 13 are in each case in thermal contact with one another through a common wall), heating of the relatively cold gas flows therefore takes place by means of the exchange of heat with the exhaust gases which have already been heated in the arrangement, in particular by means of the catalytic converters provided. In particular also by means of the deflection, provided in the deflecting section c of the particle filter arrangement 10 according to the invention, of the exhaust-gas flows emerging from the filter section d and more precisely from the line segment 12 and passing once again into the third line segment 13 of the second filter section 2, the exhaust-gas flows entering directly from the inlet section a into the first line segment 11 of the filter section d of the particle filter arrangement 10 are already heated up such that they have a significantly higher temperature, such that full loading of the particle filters 4 and 14 can be largely prevented and the entire filtering process is therefore made significantly more efficient. The overall particle arrangement 10 is also, by means of the design according to the invention, brought up to a correspondingly high temperature in a significantly shorter time. By means of experiments, it was found that the temperature generated in the particle filters 4 and 14 is sufficient for the virtually complete deflagration of the soot particles. In particular, depending on the respective starting temperature, which is determined not least by the type of engine, the exhaust gases are at a temperature, already before the inlet into the particle filters 4 and 14, which is sufficiently high that virtually no more soot particles are contained in the exhaust gases. The temperature increase which is obtained according to the invention is also so great that a particulate matter filter can be omitted.

Figure 1B:
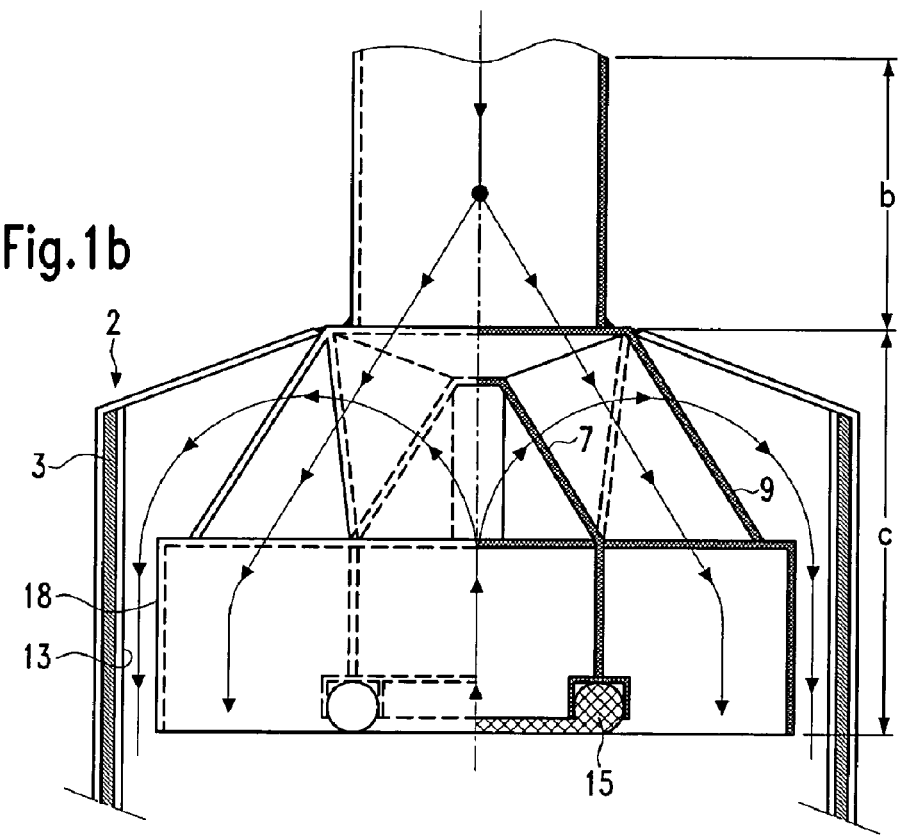
FIG. 1b shows a schematic illustration in longitudinal section of a part of FIG. 1a in greater detail, for a closer explanation of the particle filter according to the invention as per the first exemplary embodiment.
Figure 1C:
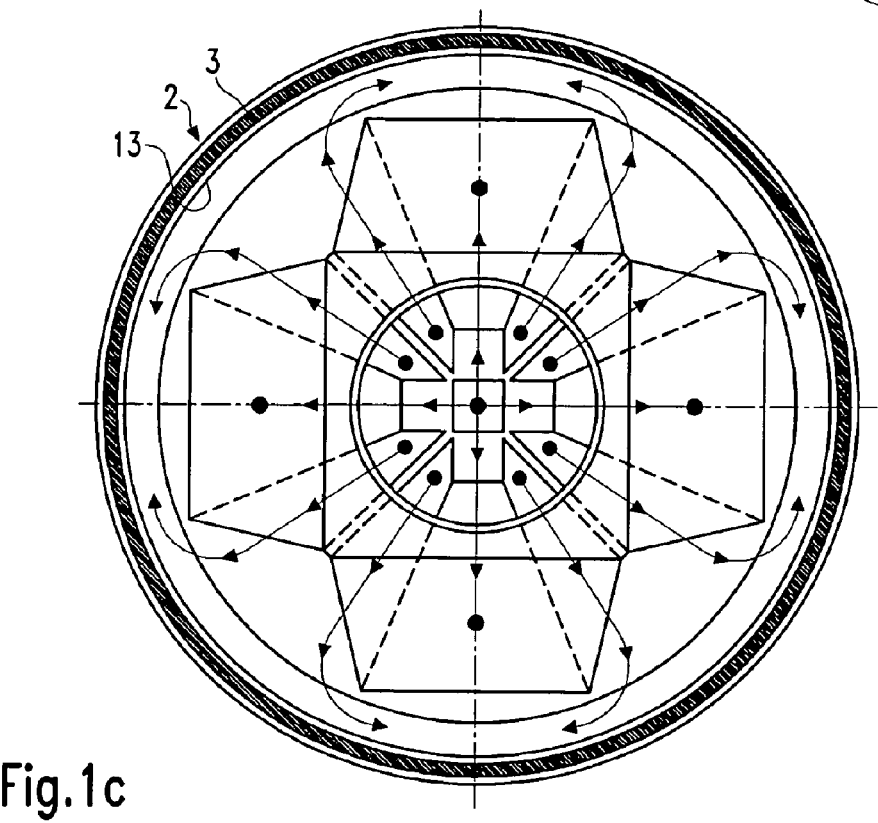
FIG. 1c shows a schematic illustration, in a plan view, of the part illustrated in FIG. 1b in greater detail, for a closer explanation of the particle filter arrangement according to the invention as per the first exemplary embodiment.

The inner construction of the deflecting section c of the particle filter arrangement 10 is explained in greater detail on the basis of FIGS. 1b and 1c. In this regard, it should be noted that various components illustrated in FIG. 1a have been omitted for better clarity. This applies in particular to the two pre-catalytic converters 6 and 16. From a comparison of FIGS. 1b and 1c, it is possible to see a total of four ducts with an inner wall 7 and an outer wall 9, which ducts are arranged in a star shape symmetrically with respect to the central axis, and specifically so as to be offset relative to one another by approximately 90 degrees, which ducts deliver the exhaust gases, which are delivered from the filter pre-section b, into the annular space in which the pre-catalytic converter 16 is arranged. Furthermore, it can be seen from FIGS. 1b and 1c that the exhaust gas flows which enter from the second line segment 12, in which the particle filter 4 is arranged, into the deflecting section c again are deflected by approximately 180 degrees into ducts which are arranged offset relative to the abovementioned ducts, formed by the inner wall 7 and the outer wall 9, and enter into the radially outer third line segment 13 of the filter arrangement d.

On account of the offset arrangement of the ducts which provide the forward flow and recirculation of the exhaust gases, the inner part (with the exception of the outer housing 2) of the particle filter arrangement 10 can also be referred to as a "star". The front deflecting section c therefore has a deflecting and distributing functionality. The front deflecting section c serves firstly to distribute and deflect, or change the direction of, the approaching exhaust-gas flow into an annular region (the first line segment 11 with the particle filter 14 arranged therein) which is arranged around the central axis of the arrangement. Furthermore, the deflecting section c serves to distribute, or also deflect or reverse by approximately 180 degrees, exhaust-gas flows which are delivered from the central region of the arrangement (specifically from the second line segment 12 with the particle filter 4 arranged therein) into the radially outer duct with the line segment 13 formed therein without an element which serves to provide exhaust-gas after treatment.

Figure 2A:
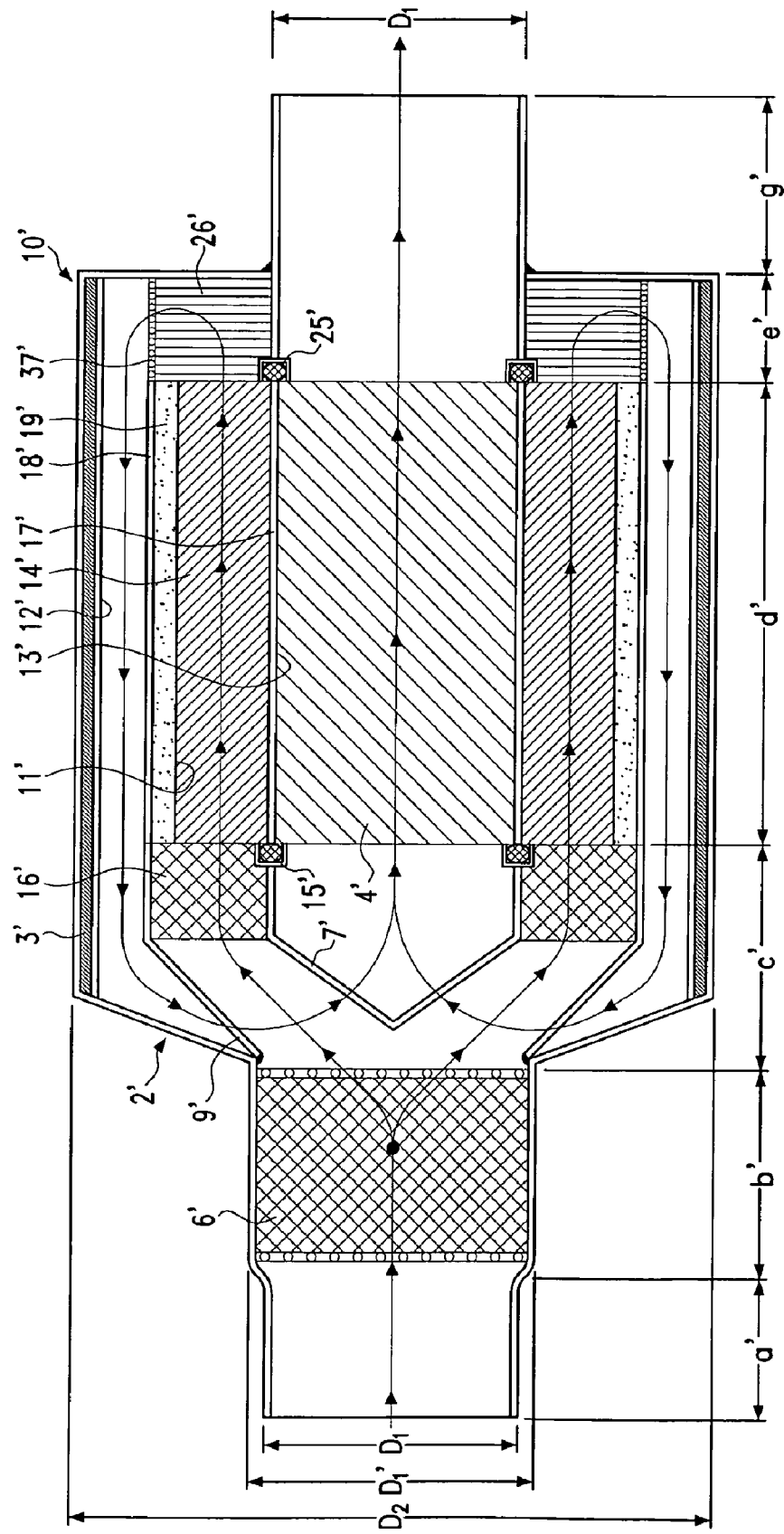
FIG. 2a shows a schematic illustration in longitudinal section for explaining a second exemplary embodiment of a particle filter arrangement according to the invention.
Figure 2B:
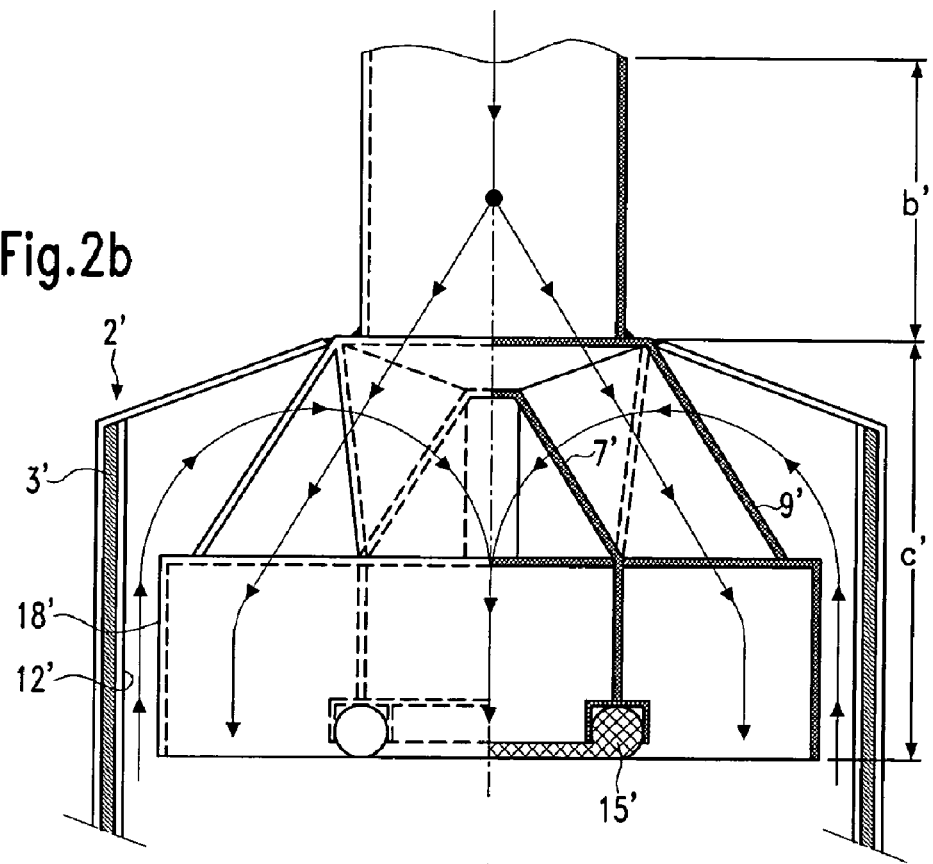
FIG. 2b shows a schematic illustration in longitudinal section of a part of FIG. 2a in greater detail, for a closer explanation of the particle filter according to the invention as per the second exemplary embodiment.
Figure 2C:
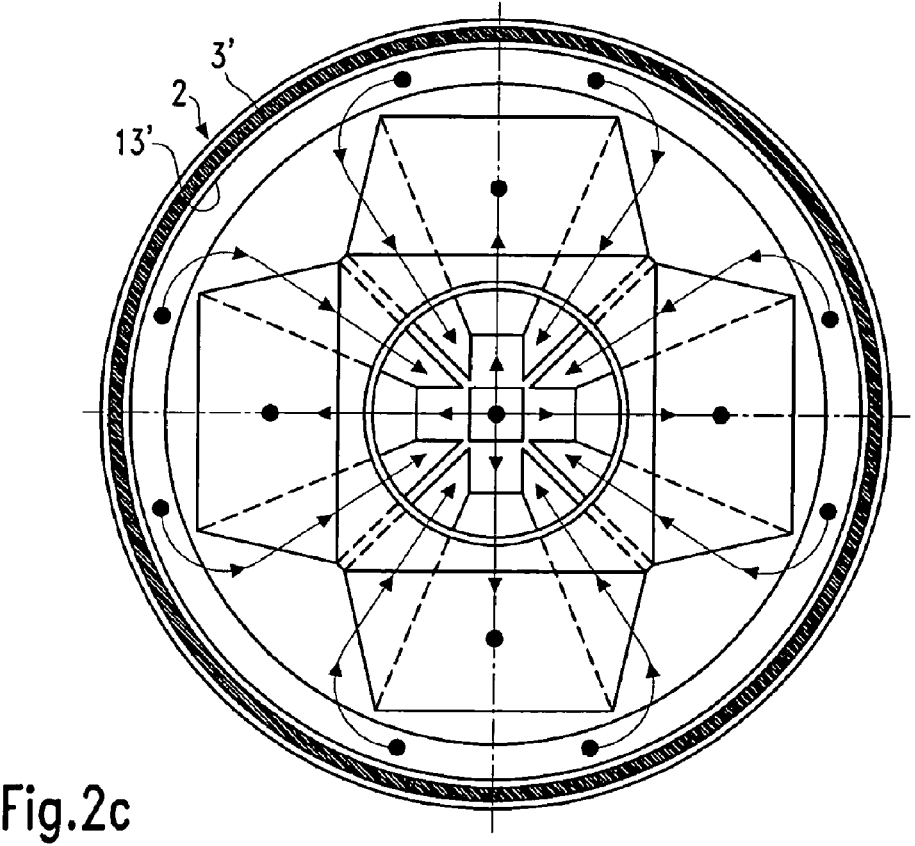
FIG. 2c shows a schematic illustration, in a plan view, of the part illustrated in FIG. 2b in greater detail, for a closer explanation of the particle filter arrangement according to the invention as per the second exemplary embodiment.

Below, a second exemplary embodiment of the particle filter arrangement 10' according to the invention is explained in more detail on the basis of FIGS. 2a to 2c. The second exemplary embodiment of the particle filter arrangement 10' according to the invention illustrated in FIGS. 2a to 2c is generally similar to the first exemplary embodiment already described in connection with FIGS. 1a to 1c. Only the differences in relation to the already-described first exemplary embodiment are therefore discussed below. The particle filter arrangement 10' according to the second exemplary embodiment has no filter post-section f. The outlet section g' directly adjoins the rear deflecting section e'. The catalytic converter 26' of the particle filter arrangement 10' is, in contrast to the catalytic converter 26 of the particle filter arrangement 10, of annular design and is formed symmetrically with respect to the central axis of the particle filter arrangement 10'. The inner diameter of the catalytic converter 26' corresponds to $D_1$ and the outer diameter of the annular catalytic converter 26' corresponds approximately to that of the particle filter 14'. More precisely, the size and arrangement of a perforated plate 37' which runs along the outer periphery of the catalytic converter 26' corresponds to the outer wall 18' of the particle filter 14'. The catalytic converter 26' is sealed off with respect to the outlet section g' by means of an extended housing wall of the outlet section g'. For this purpose, a seal 25', which is situated opposite the seal 15', is also provided at the outlet-side end of the particle filter 4'. The structural differences provide a different flow profile of the exhaust gases in the particle filter arrangement 10' of the second exemplary embodiment than in the particle filter arrangement 10 of the first exemplary embodiment. The profile of the exhaust gas flow takes place initially as in the first exemplary embodiment explained in the introduction. After the exhaust gases enter in through the inlet section a' and the filter pre-section b', the exhaust gases are conducted by the deflecting element 10', in which the catalytic converter 16' is arranged, into the first line segment 11' which forms a part of the filter section d' and in which the particle filter 14' is arranged. Directly after emerging from the line segment 11', the exhaust gases enter into the catalytic converter 26' and are then, in contrast to the first exemplary embodiment explained in the introduction, deflected into an annular duct provided radially at the outside. In the outer duct, the exhaust gases flow in the opposite direction, that is to say from the outlet toward the inlet, as can be clearly seen from FIGS. 2a to c by means of the exhaust-gas flow indicated by arrows. The second line segment 12', which corresponds to the region of the outer radial duct in the region of the filter section d', is therefore arranged at the very outside in this embodiment. From the filter section d', the exhaust gases enter once again into the deflecting section c', specifically without mixing taking place with the exhaust-gas flows newly delivered from the filter pre-section b'. Although no mixing of the exhaust-gas flows takes place, a heat-exchanging effect is generated in the deflecting section c', as in the first exemplary embodiment, since the exhaust gases delivered from the filter section d' are brought up to a significantly higher temperature as a result of passing through the catalytic converters 16' and 26', specifically in comparison with the exhaust-gas flows entering into the deflecting section c' from the pre-catalytic converter 6' of the filter pre-section b'. An exchange of heat, that is to say heating of the exhaust-gas flows entering into the catalytic converter 16' or also of the surrounding parts or components, is obtained by means of common walls of the otherwise separate ducts, which makes the filtering process more efficient and in particular also prevents full loading of the filter. By means of the deflecting element c', the exhaust-gas flows are conducted from the second line segment 12' into the third line segment 13' which is arranged centrally in this embodiment and in which the particle filter 4' is situated. The exhaust-gas flows are flowing in the desired outlet direction, that is to say in the direction from the inlet toward the outlet, already before they enter into the particle filter 4'. After passing through the particle filter 4', the exhaust gases emerge out of the particle filter arrangement 10' through the outlet pipe, which extends across the sections e' and g', with an outer diameter $D_1$. Here, in relation to the particle filter arrangement 10, the particle filter arrangement 10' is more compact on account of the omission of the post-catalytic converter 36 and has the advantage of heating up faster since the exhaust-gas flow emerging from the particle filter arrangement 10' is conducted centrally in the arrangement for a relatively long time, which has a positive effect on the equilibrium temperature which is generated in the overall arrangement.

The deflecting element c' of the particle filter arrangement 10' of the second exemplary embodiment is illustrated in greater detail in the schematic illustrations of FIGS. 2b and 2c. The construction fundamentally corresponds to that of the construction of the deflecting element c of the particle filter arrangement 10 of the first exemplary embodiment already described in connection with FIGS. 1b and 1c. What differs from the latter is however the flow direction of the exhaust-gas flow which is to be reversed by 180 degrees, which exhaust-gas flow, in the second exemplary embodiment, is deflected from the second line segment 12', which is formed in this case in the outer duct, and into the central region with the particle filter 4' arranged therein. This can also be clearly seen from the illustration of the corresponding arrows in FIGS. 2b and 2c. From a structural point of view, the two exemplary embodiments of the particle filter arrangement 10, 10' differ merely with regard to the design of the outlet-side end, in particular with regard to the rear deflecting element e', with the exhaust-gas guidance which is altered in this way duly altering the flow of the exhaust gases in the arrangement at the inlet-side end too, in particular with regard to the front deflecting element c', but requiring substantially no structural modifications.

Figure 3:
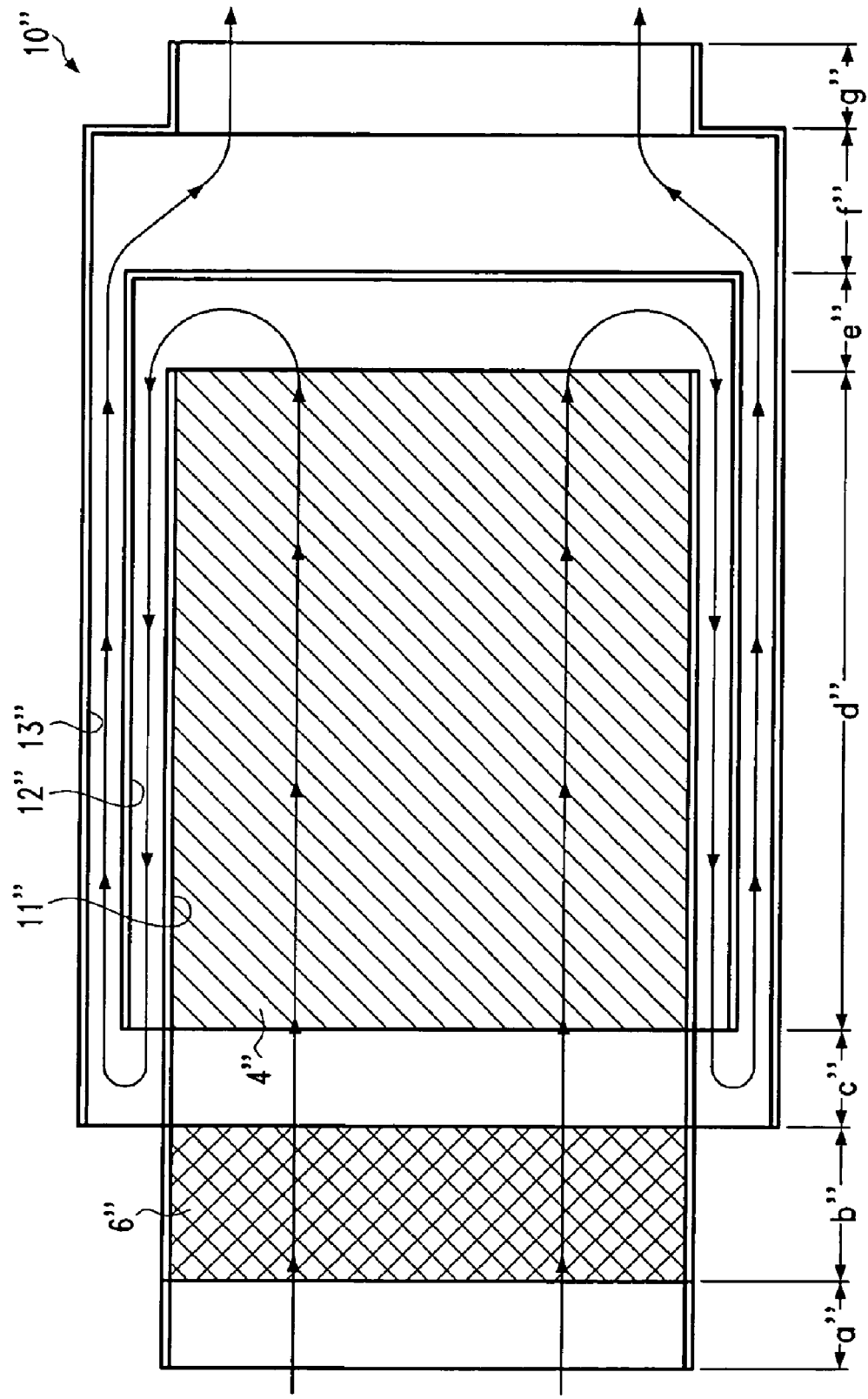
FIG. 3 shows a schematic illustration in longitudinal section for explaining a third exemplary embodiment of a particle filter arrangement according to the invention.

A third exemplary embodiment of a particle filter arrangement 10" according to the invention is explained in more detail below on the basis of the schematic longitudinal section illustration of FIG. 3. The present third exemplary embodiment of the particle filter arrangement 10" according to the invention is similar to the first two exemplary embodiments in the sense that three line segments 11", 12" and 13" are provided which are traversed by the exhaust-gas flow in the sequence and which are arranged concentrically with respect to one another. The exhaust-gas flow which is indicated by arrows enters through the inlet section a" into the particle filter arrangement 10". A catalytic converter 6" is provided in the filter pre-section or catalytic converter section b". The exhaust-gas flow subsequently passes into the inlet section c" and subsequently into the filter section d" in which a particle filter 4" is arranged. In the rear deflecting section e", the exhaust-gas flow is deflected outward by approximately 180 degrees from the first line segment 11" into the second line segment 12". Another deflection of the exhaust-gas flow outward by approximately 180 degrees into the third line segment 13" then takes place in the outer region of the section c". After flowing through the third line segment 13", the exhaust gases pass into the filter post-section f" and then into the outlet section g". A characteristic of the present third exemplary embodiment of a particle filter arrangement 10" according to the invention is that no distributing and deflecting element is provided in the section c". This means in particular that the exhaust-gas flow passes directly from the inlet section a" into the filter section d" without a change in direction. The two deflections, according to the invention, of the exhaust-gas flow by approximately 180 degrees are provided in the rear deflecting section e" and only in the outer region of the section c". By omitting the distributing and deflecting element in section c", the filter capacity of the particle filter arrangement 10" is duly reduced since the exhaust gases passing from the engine can no longer be heated up to the same extent as is the case on account of the heat-exchange effect, described in connection with the first two exemplary embodiments, on account of the throughflow without the mixture of approaching, relatively cold exhaust gases with recirculated exhaust gases which are heated by means of treatment. However, the present third exemplary embodiment has the advantage of significantly more favorable production costs. As a result of the two-fold outward deflection (and not once inward as in the first two exemplary embodiments), the exhaust-gas flow and therefore also the construction is significantly simplified. Furthermore, this exemplary embodiment is advantageous in the sense that limit values for the counterpressure (generally of a few hundred millibars at full load) are avoided. In the variant of the invention, it is possible for a corresponding predefined maximum counterpressure value, whose exceedance can lead to overheating of or damage to the engine, to be set in a simple way by virtue of the transverse and longitudinal dimensions of the particle filter 4" being adapted in a simple manner corresponding to the engine used.

The invention has been explained in more detail above on the basis of preferred exemplary embodiments thereof. For a person skilled in the art, it is however obvious that different variations and modifications may be made without departing from the concept on which the invention is based.

What is claimed is:

1. An exhaust gas filtering method for an internal combustion engine, the method comprising:
    (a) positioning a particle filter arrangement along the exhaust gas flow, the particle arrangement comprising:
        a housing including an inlet and an outlet;
        a filter section disposed within the housing, wherein the filter section comprises:
            a first segment possessing a substantially cylindrical cross-section, the first segment being located downstream from and in fluid communication with the inlet, wherein the first segment directs the exhaust gases in a first direction,
            a second segment possessing a substantially annular cross-section, the second segment being located downstream from and in fluid communication with the first segment, wherein the second segment directs the exhaust gases in a second direction that is opposite the first direction,
            a third segment possessing a substantially annular cross-section, the third segment being located downstream from and in fluid communication with the second segment, wherein the third segment directs the exhaust gases in a third direction that is opposite the second direction, and
            a particle filter arranged within a flow path of the exhaust gases,
        a deflecting section disposed within the housing, and
        a distributing and deflecting element disposed within the deflecting section,
    wherein the distributing and deflecting element comprises ducts operable to simultaneously conduct exhaust gases in multiple flow directions,
    wherein the first, second, and third segments are substantially concentric, the first segment is nested within the second segment, and the second segment is nested within the third segment;
    (b) receiving the exhaust gases at the inlet of a particle filter arrangement;
    (c) conducting exhaust gas flow passing from the inlet into the distributing and deflecting element, wherein the distributing and deflecting element distributes the inlet gas flow to the first segment, and wherein the flow direction of the exhaust gases in the first segment is substantially in the direction of the outlet;
    (d) conducting the exhaust gas flow passing from the first segment into the second segment, wherein the flow direction of the exhaust gases in the second segment is substantially in the direction of the inlet; and
    (e) conducting the exhaust gas flow passing from the second segment into the distributing and deflecting element, wherein the distributing and deflecting element deflects the second segment gas flow into the third segment, and wherein the flow direction of the exhaust gases in the third segment is substantially in the direction of the outlet.

2. The method of claim 1, wherein the distributing and deflecting element is configured to generate a star-shaped deflection pattern in which the inlet gas flow and the second segment gas flow pass through the element without being mixed.

3. A particle filter arrangement for filtering exhaust gases of an internal combustion engine, the particle filter arrangement comprising:
    a housing including an inlet and an outlet;
    a filter section disposed within the housing, wherein the filter section comprises:

a first segment possessing a substantially cylindrical cross-section, the first segment being located downstream from and in fluid communication with the inlet, wherein the first segment directs the exhaust gases in a first direction, a second segment possessing a substantially annular cross-section, the second segment being located downstream from and in fluid communication with the first segment, wherein the second segment directs the exhaust gases in a second direction that is opposite the first direction, a third segment possessing a substantially annular cross-section, the third segment being located downstream from and in fluid communication with the second segment, wherein the third segment directs the exhaust gases in a third direction that is opposite the second direction, and a particle filter arranged within a flow path of the exhaust gases;

a deflecting section disposed within the housing; and a distributing and deflecting element disposed within the deflecting section, wherein the distributing and deflecting element comprises ducts operable to simultaneously conduct exhaust gases in multiple flow directions, wherein the first, second, and third segments are substantially concentric, the first segment is nested within the second segment, and the second segment is nested within the third segment.

4. The particle filter arrangement of claim 3, wherein:
the distributing and deflecting element is operable to simultaneously distribute exhaust gas flow passing from the inlet to the first segment and to deflect exhaust gas flow passing from the second segment to the third segment, and
the exhaust gas flows pass through the distributing and deflecting element without being mixed.

5. The particle filter arrangement of claim 3, further comprising:
a first region between the first and the second segments;
a second region between the second and third segments; and
a catalytic converter arranged in at least one of the first and second regions.

6. The particle filter arrangement of claim 3, further comprising a catalytic converter arranged downstream of the inlet in the flow direction of the exhaust gases.

7. The particle filter arrangement of claim 3, wherein the internal combustion engine comprises a diesel internal combustion engine.

8. The particle filter arrangement of claim 3, wherein:
the distributing and deflecting element comprises a plurality of ducts oriented radially about a central axis;
at least one duct is in fluid communication with the inlet and the first segment to direct exhaust gas from the inlet into the first segment; and
at least one duct is in fluid communication with the second segment and the third segment to direct exhaust gas from the second segment to the third segment.

9. The particle filter arrangement of claim 3, wherein:
the distributing and deflecting element comprises a central axis; and
the ducts of the distributing and deflecting element conduct exhaust gases radially outward from the central axis to at least one of the first segment and the third segment.

10. The particle filter arrangement of claim 3, wherein the distributing and deflecting element comprises:
a duct operable to conduct exhaust gases passing from the inlet into the first segment; and
a duct operable to conduct exhaust gases passing from the second segment into the third segment.

11. The particle filter arrangement of claim 3, wherein:
in the first direction, the exhaust gases flow toward the housing outlet;
in the second direction, the exhaust gases flow toward the housing inlet; and
in the third direction, the exhaust gases flow toward the housing outlet.

12. The particle filter arrangement of claim 3 further comprising a pre-catalytic converter oriented downstream from the housing inlet, a first particle filter oriented within the first segment, and a second particle filter oriented within the second segment.

13. The particle filter arrangement of claim 3 further comprising a catalytic converter bridging the first and second segments, wherein the catalytic converter directs the exhaust gases passing from the first segment into the second segment and alters the flow direction of the exhaust gases passing from first segment.

14. The particle filter arrangement of claim 3, wherein the distributing and deflecting element is configured to transfer heat between the exhaust gases passing from the inlet into the first segment and the exhaust gases passing from the second segment into the third segment.

15. The particle filter arrangement of claim 3, wherein the distributing and deflecting element comprises radially positioned ducts, each duct operable to conduct gas flow in a predetermined direction.

16. The particle filter arrangement of claim 3, wherein the exhaust gas flows pass through the distributing and deflecting element without being mixed.

17. The particle filter arrangement of claim 3, wherein the distributing and deflecting element is configured to generate a star-shaped deflection pattern in which the inlet gas flow and the second segment gas flow pass through the element without being mixed.

18. The particle filter arrangement of claim 3, wherein the distributing and deflecting element comprises:
a first duct for conducting exhaust gas flow passing from the inlet to the first segment; and
a second duct for conducting the exhaust-gas flow passing from the second segment into the third segment,
wherein at least a part of an outer wall of the first duct forms an inner wall of the second duct.

19. The particle filter arrangement of claim 18, wherein the distributing and deflecting element:
conducts the first gas flow so as to substantially maintain its direction in the arrangement, and
deflects the second gas flow by an angle of approximately 180 degrees.

* * * * *